Dec. 2, 1952 R. M. CROOKER 2,620,457

CHASSIS VOLTAGE NEUTRALIZATION

Filed Aug. 30, 1950

INVENTOR.
Robert M. Crooker

BY Foorman L. Mueller

Atty.

Patented Dec. 2, 1952 2,620,457

UNITED STATES PATENT OFFICE 2,620,457

CHASSIS VOLTAGE NEUTRALIZATION

Robert M. Crooker, Chicago, Ill., assignor to Motorola, Inc., Chicago, Ill., a corporation of Illinois Application August 30, 1949, Serial No. 113,195

8 Claims. (Cl. 315—29)

This invention relates to electronic equipment such as a television receiver containing a source of extremely high voltage, and particularly to means for preventing the chassis of such equipment from acquiring an undesirable electrostatic potential while the equipment is operating.

In the construction of television receivers and other types of electronic equipment the chassis customarily is coupled to the negative or B— terminal of the power supply in order to prevent the chassis from "floating" electrostatically with respect to B—. Otherwise, due to unavoidable current leakages between the chassis and various high-voltage points in the receiver circuits, the chassis might acquire an undesirably high potential. The impedance of this coupling should be as low as practicable so that substantially no potential difference exists between the chassis and B—. Where the B— terminal is connected conductively to one side of the external power line, however (as is done in some radio and television sets), the impedance of the coupling between chassis and B— is required to be sufficiently high to prevent any shock hazard, for there may be times when the chassis is connected to the "hot" side of the power line depending upon how the power cord plug is inserted into the electric outlet. This impedance might include, for example, a total capacitance of 0.15 microfarad as an alternating-current path, and a resistance of around 470,000 ohms for direct-current path.

A television receiver utilizes, in addition to the usual direct-current power supply, a high voltage power supply which furnishes a high anode potential for the picture tube. In the type of television receiver under consideration having a conductively coupled power line circuit, this high voltage power supply is, of necessity, coupled on its low-potential side to the negative or B— terminal of the receiver, and at some high-potential point or points in said power supply there is apt to be a certain amount of unwanted capacitive leakage to the chassis. Hence, the high voltage source is coupled on opposite sides thereof to B— and to the chassis of the receiver, respectively. Inasmuch as the chassis is coupled to B— through the aforesaid small capacitor, a divider action takes place, with the chassis acquiring a certain electrostatic pulse potential relative to B— by virtue of the unwanted leakage capacitance between the pulsed high voltage power supply and the chassis.

In practice, this peak pulse potential difference between the chassis and B— may be on the order of 3 volts. One obvious way to reduce this potential difference would be to increase the capacitance of the coupling capacitor, but this would not be permitted by safety requirements because of the resulting shock hazard, as mentioned above. Another obvious way to remove the chassis potential would be to eliminate the leakage capacitance between the high voltage power supply and the chassis. However, this would not be economically feasible, as it would entail expensive shielding of many components (with the shield being connected to B—) and would thereby substantially increase the cost of the receiver.

An object of the present invention is to provide novel and inexpensive means in a television receiver or the like for preventing the high voltage source from establishing an electrostatic potential difference between the chassis and the negative or B— terminal of the receiver.

Another object is to accomplish the foregoing in a safe manner, without substantially increasing the cost of the receiver, by utilizing simple and economical means which can readily be incorporated in existing television receivers.

A feature of the invention is the provision of novel voltage neutralizing means between the chassis and the B— terminal, such neutralizing means comprising an inductive turn or loop disposed on a choke in the high voltage power supply of the receiver. This loop is connected in series with the chassis coupling capacitor, and it furnishes a pulse voltage opposing the pulse voltage which is impressed upon the chassis through any leakage capacitance which may happen to exist between the chassis and the high voltage power supply within the receiver.

The foregoing and other objects and features of the invention will be understood better from the following detailed description thereof taken in connection with the accompanying drawings wherein.

Figures 1, 2, 3, 4, 5:
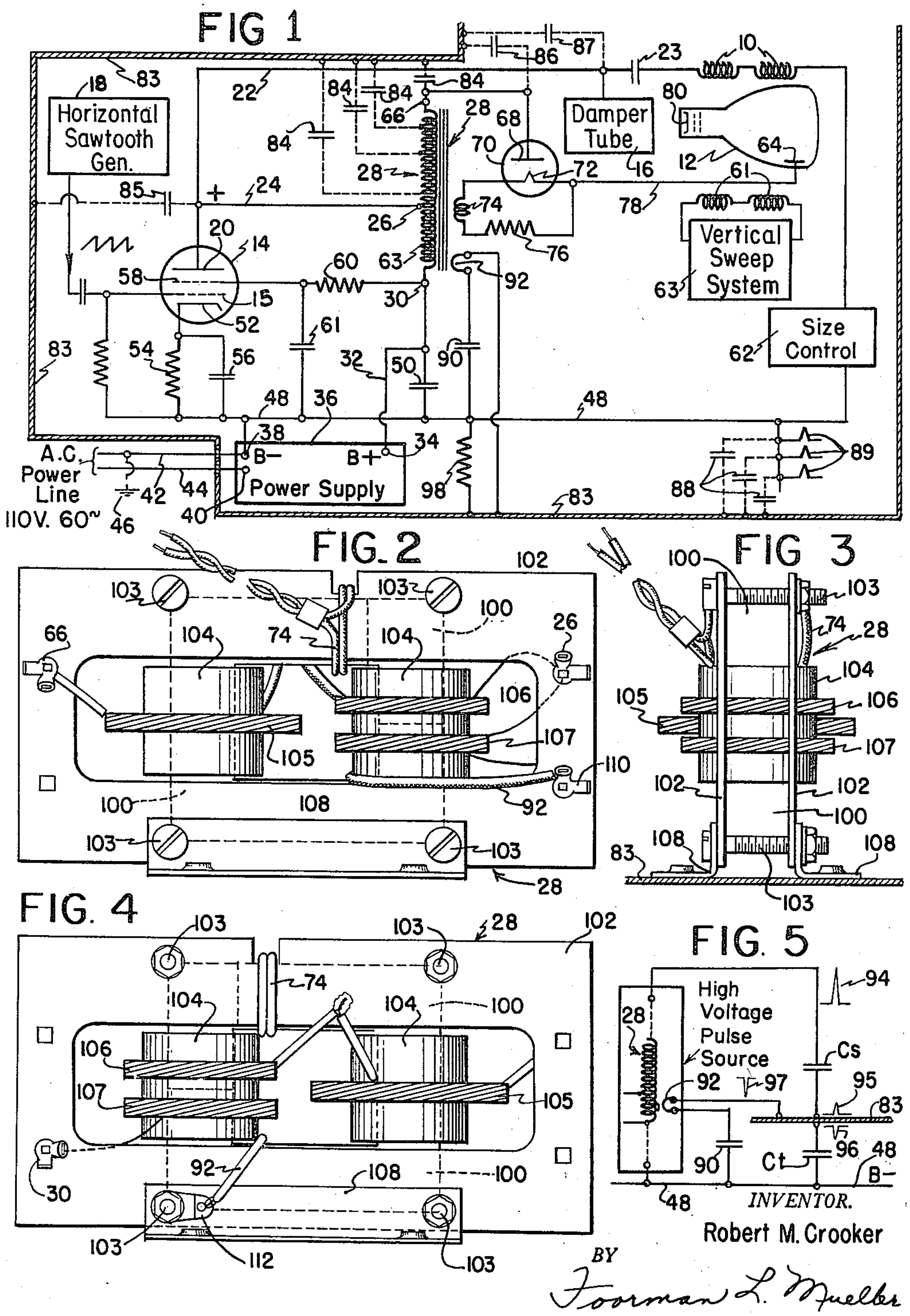
Fig. 1 is a schematic view showing the invention embodied in a television high voltage power supply.
Fig. 2 is a front elevational view of a choke used in this power supply.
Fig. 3 is an end elevational view of the choke.
Fig. 4 is a rear elevational view thereof.
Fig. 5 is a diagrammatic representation of the essential structural elements which are involved in the present invention.

In practicing the invention, a choke included in the high voltage power supply of a television receiver is provided with an inductive loop or turn. The capacitor which couples the chassis to B— is, according to the invention, connected in series with this turn. The polarity of the pulse voltage induced in the turn is such as to oppose the polarity of any pulse voltage applied by the high voltage power supply to the chassis through the medium of unwanted leakage capacitances in the receiver. Hence, the voltage which otherwise would be impressed upon the chassis is neutralized, causing the chassis potential to be the same as B— insofar as the high voltage power supply is concerned while still maintaining the chassis isolated from any external power source which may be connected to the B— terminal.

Fig. 1 illustrates schematically a portion of a television receiver having a combination horizontal sweep system and high voltage power supply. The horizontal deflecting coils 10 of the electromagnetic picture tube 12 are supplied with a sawtooth current wave for deflecting the electron beam of the picture tube 12 intermittently across the face of this tube. This current wave is produced by the interaction of a power tube 14 and a damper tube 16. The power tube 14 has a control grid 15 to which is applied a sawtooth voltage wave by a horizontal sawtooth generator 18, with the tube 14 being driven as a Class C amplifier to furnish current during the latter half of the sawtooth cycle. (Sawtooth current during the first half of the cycle is supplied mainly by the damper tube 16 in a well-known manner.) The plate 20 of the tube 14 is coupled by a conductor 22 and a capacitor 23 to the horizontal deflecting coils 10, and it is also connected by a conductor 24 to a tap 26 on the winding of a choke 28. One terminal 30 of the choke 28 is connected by a conductor 32 to the positive or B—plus terminal 34 of a direct-current power supply 36.

The power supply 36 has power input terminals 38 and 40 which are electrically connected to the conductors 42 and 44 of an alternating-current power line or cord. When this line or cord is plugged into an electric outlet, one or the other of the conductors 42 and 44 in this line is electrically grounded through the public utility system, as indicated at 46. The other conductor constitutes the high-voltage or "hot" side of the line.

When alternating-current power is furnished to the power supply 36, the same is converted by a suitable rectifier-filter means to direct current which is made available at the output terminals 38 and 34 of the power supply 36. The negative or B— terminal 38 is common to both the input and output sides of the power supply 36 in this particular receiver. The terminal 38 is connected conductively to a B— conductor 48 which is common to many of the circuits in the television receiver. A bypass capacitor 50 connected between the conductors 32 and 48 shunts the power supply 36 with respect to sweep-frequency currents. The cathode 52 of the power tube 14 is connected by the parallel combination of a bias resistor 54 and a bypass capacitor 56 to the B— conductor 48. The screen grid 58 of the power tube 14 is connected through a dropping resistor 60 to the terminal 30 of the choke 28, which is connected electrically by the conductor 32 to the B— plus terminal 34 of the power supply 36. The screen grid 58 also is appropriately bypassed to B— by a capacitor 61.

As sawtooth voltage pulses are supplied by the generator 18 to the control grid 15, the plate current drawn by the power tube 14 is caused to vary periodically, producing a sawtooth current wave through the horizontal deflecting coils 10 of the picture tube 12. During each period of this sawtooth current wave, a horizontal line of the television picture is traced on the viewing screen of the tube 12. The retrace or flyback of the electron beam is produced by the steep portion of the current wave. The horizontal picture size is determined by the setting of the size control 62.

The vertical deflecting coils 61 of the picture tube 12 are energized by a vertical sweep system 63. The details of this sweep system are not disclosed herein since they are not essential to an understanding of the present invention.

During each horizontal sweep of the electron beam, energy is stored mainly in the magnetic field of the deflecting coils 10 and also to some extent in the choke primary 63. This energy must be released during the retrace interval. The disclosed horizontal sweep system is adapted to utilize this released energy for developing an extremely high direct-current voltage (about 11,000 volts) which is supplied to a high-voltage anode 64 of the picture tube 12. The particular means whereby this is accomplished is disclosed herein to the extent necessary for understanding the present invention, being more fully disclosed and claimed in the copending application of George W. Fyler and Robert M. Crooker, Serial No. 105,-844, filed July 20, 1949. Each time that the energy is released from the magnetic field of the horizontal deflecting coils 10, a surge or pulse of high voltage is developed in the winding of the choke 28. The high-voltage terminal 66 of the choke 28 is connected to the plate 68 of a diode rectifier 70. The filamentary cathode 72 of the diode 68 is supplied with heating current by a winding 74 consisting of a few turns of wire around the choke 28. A resistor 76 limits this heating current. The cathode 72 of the diode 70 is connected by a conductor 78 to the accelerating anode 64 of the picture tube 12.

The high voltage pulses in the choke 28 are rectified by the diode 70, and the rectified output voltage charges the picture tube capacitance (between the anode 64 and the cathode 80 of the picture tube 12) to a very high value, on the order of 11,000 volts. This provides the desired operating potential on the anode 64 of the picture tube 12. With the tap 26 positioned on the winding of the choke 28 so that approximately one-fourth of the total number of turns is in the primary 63 between the terminals 26 and 30 (giving a transformation ratio of 4:1), the potential of the conductor 24 rises to about 2500 volts while that of the point 66 rises to about 11,000 volts during each retrace interval when the stored-up energy is released from the magnetic field of the deflecting coils 10.

The periodic transfer of energy from the deflecting coils 10 to the plate circuit of the power tube 14 establishes a source of high-voltage pulses as diagrammatically indicated in Fig. 5, such source having its low-potential side at the conductor 48 leading to the B— terminal 38. The choke 28 is, of course, an instrumental part of this voltage source. Unwanted capacitive coupling between the high-voltage portion of the choke 28 and the chassis 83 affords many leakage paths through which pulse voltages may be applied to the chassis 83. As indicated in Fig. 1, these capacitive couplings (represented by the capacitors 84) are distributed along the winding of the choke 28, being particularly troublesome in the high-voltage section of the choke winding. Other capacitive couplings exist between various other high-voltage points of the sweep circuit and the chassis 83. For example, there is a capacitive coupling represented by the capacitor 85 between the plate 20 of the power tube 14 and the chassis 83, a similar capacitive coupling 86 between the plate of the diode 70 and the chassis 83, and still another capacitive coupling 87 between the damper tube 16 and the chassis 83. The various capacitive couplings between the high-voltage pulse source and the chassis 83 are symbolized in Fig. 5 by the capacitor $C_s$, representing the sum total of the stray capacitances.

The chassis 83 also is coupled capacitively to the B— conductor 48. Thus, there are various stray capacitances such as those represented by the capacitors 88 extending between the chassis 83 and the various tube heaters 89 (which are connected on one side thereof to the B— conductor 48). In Fig. 5 the total stray capacitance of this nature is represented by the capacitor $C_t$. In a television receiver of the type under consideration this capacitance may amount to, say, 0.10 microfarad. The total effective capacitance between the chassis 83 and the B— conductor 48 must not exceed 0.15 microfarad, according to underwriters' requirements. The purpose of this limitation is to reduce the shock hazard to a harmless level in case the chassis should be connected to the "hot" side of the power line. The balance of the permitted capacitance, about 0.05 microfarad, is provided by a capacitor such as 90 which, in ordinary practice, is connected directly between the chassis 83 and the B— conductor 48. In the present instance, however, this capacitor 90 is connected in series with an inductive loop or turn 92 on the choke 28 for voltage neutralization purposes, as will be explained presently. The total 0.15-microfarad capacitance between the chassis 83 and the B— conductor 48 provides a low-impedance path for radio-frequency and sweep-frequency currents. A resistor 93 having a resistance of the order of 470,000 ohms is connected between the chassis 83 and the B— conductor 48, as shown in Fig. 1, to provide a direct-current path.

As can be seen from Fig. 5, the capacitor $C_t$ (which in the present instance comprises various leakage capacitances between the chassis 83 and the B— conductor 48 and which, in the ordinary receiver, would include also an actual capacitor such as 90 for bringing the total capacitance up to the allowable maximum value) is connected in series with the leakage capacitance $C_s$ between the high side of the high-voltage pulse source and the chassis 83. Thus, there is a capacitance divider connected across the terminals of the high-voltage pulse source, with the chassis 83 being connected to an intermediate voltage point at the junction of $C_s$ and $C_t$. Hence, when a high-voltage positive pulse represented by the pulse 94, Fig. 5, is generated and impressed across this series circuit, a fraction of this positive pulse, represented by the pulse 95, is applied between the chassis 83 and the B— conductor 48, tending to place the chassis 83 at a positive potential with respect to B—. This results from the presence of the unwanted leakage capacitance $C_s$. Such leakage capacitance cannot be reduced sufficiently without resorting to extensive insulation and excessive isolation of the components from the chassis, which the limited available space does not allow.

In accordance with the principles of the present invention, the positive voltage pulse 95, Fig. 5, applied to the chassis 83 through the capacitance divider consisting of the capacitors $C_s$ and $C_t$ is neutralized by a negative voltage pulse 96 applied to the chassis 83 in phase therewith. To obtain this negative pulse, the aforesaid inductive loop 92 on the choke 28 is utilized. This loop 92, in the present embodiment, is connected in series with the capacitor 90 between the chassis 83 and the B— conductor 48. The polarity of the loop 92 is such that at the same instant when the high-voltage pulse source is delivering a positive pulse 94 to the series combination of the capacitors $C_s$ and $C_t$, the loop 92 is furnishing a negative voltage pulse 97 to a series circuit consisting of the capacitors 90 and $C_t$. The fractional portion of this negative pulse 97 which appears between the chassis 83 and the B— conductor 48 is the negative pulse 96. The positive and negative pulses 95 and 96 cancel or neutralize each other, leaving the chassis 83 at substantially the same potential as the B— conductor 48 insofar as the high voltage pulse source is concerned. Under the conditions assumed above, with an 11,000-volt peak pulse generated by the pulse source, a negative peak pulse of about three volts in the inductive loop 92 is sufficient for neutralization purposes.

While the chassis 83 is maintained at the same potential as the B— conductor 48 insofar as the high-voltage pulse source in the receiver is concerned, it is isolated from the conductor 48 by the capacitors 90 and $C_t$ and the resistor 93 insofar as the external power line is concerned. That is to say, the impedance at 60 cycles between 83 and B— is sufficiently high so that a person touching the chassis 83 and a grounded object at the same time will suffer no injury even though the B— terminal 38 is connected to the "hot" side of the power line.

The construction of the choke 28 is illustrated in Figs. 2, 3 and 4. The choke 28 has a rectangular core 100 of high-permeability, low-loss material. The core 100 is mounted between parallel insulating plates 102. Bolts 103 passed through the plates 102 serve to clamp the core 100 between these plates. The plates 102 have central rectangular openings therein through which two opposite legs of the core 100 are accessible. On these legs are disposed insulating sleeves 104 which support three series-connected annular coils 105, 106 and 107, these coils together constituting the winding of the choke 28. The coils 105 and 106 correspond to that part of the choke winding between the terminals 26 and 66, Fig. 1, and the coil 107 constitutes that portion of the choke winding between the terminals 26 and 30. Terminals 26, 30 and 66 (corresponding to the like-numbered terminals in Fig. 1) are mounted on the insulating plates 102, as shown in Figs. 2 and 4.

The choke 28 is mounted on the chassis 83, with the vertical plates 102 disposed at right angles to the chassis. A pair of brackets 108 is secured by the bolts 103 to the lower edges of the insulating plates 102. The brackets 108 are adapted to be riveted or otherwise secured to the chassis. The filament winding 74 is wrapped around one of the legs of the choke 100 in the manner shown.

The inductive turn 92, Fig. 1, is formed by looping a short length of insulated wire around one of the legs of the choke core 100, as shown in Figs. 2 and 3. One end of the wire loop 92 is soldered to a terminal lug 110 on an insulating plate 102, and the other end thereof is soldered to a terminal lug 112 that is secured by one of the bolts 103 to a mounting bracket 108. When the brackets 108 are secured to the chassis of the receiver, the terminal 112 is electrically connected to the chassis. The other terminal 110 is connected to the capacitor 90 as shown in Fig. 1.

Thus, it will be seen that insofar as any high voltage pulses originating within the television receiver are concerned, the chassis 83 of the receiver is effectively short-circuited to the B— side of the power supply. Insofar as the 60-cycle power source is concerned, the chassis 83 is effectively isolated from the B— terminal, which terminal may have 110 volts A. C. impressed upon it depending upon the way in which the plug of the electric cord is inserted into the electric outlet. The principles of the invention may, of course, be applied as well to any other type of electronic equipment having a high-voltage pulse source that is likely to charge the chassis electrostatically to an undesired potential.

While there has been described what is at present considered to be the preferred embodiment of the invention, it will be understood that various modifications thereof may be made within the true spirit and scope of the invention as defined in the appended claims.

I claim:

1. A chassis neutralization circuit for electronic apparatus having power input terminals adapted for connection to an external power line and also including an internal source of high voltage pulses conductively connected on the low-potential side thereof to one of said input terminals and coupled capacitively on the high-potential side thereof to the chassis of the apparatus through the medium of unwanted leakage capacitance, said chassis neutralization circuit coupling the chassis to said one input terminal while maintaining the effective voltage developed by said source between the chassis and said one terminal substantially equal to zero, said neutralization circuit including a capacitor, and a conductor inductively coupled to said source of high voltage pulses, said capacitor and said conductor being connected in series between the chassis and said one terminal, said conductor being inductively coupled to said source in a manner such that the voltage pulses induced in said conductor neutralize the voltage pulses that said source tends to develop between the chassis and said one terminal because of the unwanted leakage capacitance.

2. A chassis neutralization circuit for electronic apparatus having a power supply with output terminals thereof and also including a source of high voltage pulses conductively connected on the low-potential side thereof to one of said terminals and coupled capacitively on the high-potential side thereof to the chassis of the apparatus through the medium of unwanted leakage capacitance, said chassis neutralization circuit coupling the chassis to said one terminal while maintaining the effective voltage developed by said source between the chassis and said one terminal substantially equal to zero, said neutralization circuit including a capacitor and a conductor electrically connected in series between the chassis and said one terminal, said conductor having a portion thereof inductively coupled to said source of high voltage pulses and being in such phase relation thereto that the induced voltage pulses in said conductor oppose the voltage pulses impressed by said source upon the chassis by reason of the unwanted leakage capacitance.

3. A chassis neutralization circuit for electronic apparatus having a direct-current power supply with a negative terminal thereof connected conductively to one side of an external power line, which apparatus also includes an internal source of high voltage pulses conductively connected on the low-potential side thereof to said negative power supply terminal and capacitively coupled on the high-potential side thereof to the chassis of the apparatus through the medium of unwanted leakage capacitance, said neutralization circuit including a capacitor for coupling the chassis to said negative power supply terminal, and a conductor inductively coupled to said source of high voltage pulses, said conductor being disposed in series with said capacitor and being in such phase relation as to furnish voltage pulses to said capacitor which neutralize the voltage pulses supplied by said source to said capacitor through the unwanted leakage capacitance.

4. A chassis neutralization circuit for electronic apparatus having a direct-current power supply with a negative terminal thereof connected conductively to one side of an external power line, which apparatus also includes an internal source of high voltage pulses conductively connected on the low-potential side thereof to said negative power supply terminal and capacitively coupled on the high-potential side thereof to the chassis of the apparatus through the medium of unwanted leakage capacitance, said neutralization circuit including the combination of a capacitor coupling said chassis to said negative power supply terminal, and a conductor inductively coupled to said source of high voltage pulses and connected conductively to said capacitor in such manner as to apply between said chassis and said negative power supply terminal voltage pulses for neutralizing the voltage pulses applied by the high voltage pulse source through the unwanted leakage capacitance.

5. A chassis neutralization circuit for a television receiver having a source of high voltage pulses disposed upon a conductive chassis, in which a desired capacitive coupling is provided between the chassis and one side of said voltage source and an undesired capacitive coupling exists between the chassis and the other side of said voltage source, said neutralization circuit including a choke which forms a part of said voltage pulse source, said choke comprising an inductive coil energized by current pulses to develop the high voltage pulses of said source, and a conductor wound on said choke in inductively coupled relation to said coil, said conductor being connected in series with said desired capacitive coupling for furnishing a voltage pulse to the chassis which neutralizes the voltage pulse furnished to the chassis by the high-voltage pulse source through the medium of the undesired capacitive coupling.

6. In a television receiver having a picture tube with electromagnetic beam deflection means, a chassis for the receiver, current supply means including a power tube for supplying a sawtooth current wave to the deflection means of the picture tube, said current supply means having a low-potential side and a high-potential side, a desired capacitive coupling between said low-potential side and said chassis, an undesired capacitive coupling between said high-potential side and said chassis, a coupling choke connected to said current supply means in energy-transfer relation with the deflection means of the picture tube, said choke being adapted to utilize energy periodically released from the magnetic field of the deflection means for developing a high voltage to operate the picture tube, and a turn on said choke connected in series with said desired capacitive coupling between the chassis and said low-potential terminal for neutralizing the tendency of said undesired capacitive coupling to produce an unwanted potential difference between said chassis and said low-potential terminal.

7. In a television receiver having a picture tube with electromagnetic beam deflection means, a chassis for the receiver, current supply means including a power tube adapted to supply a sawtooth current wave to the deflection means of the picture tube, said current supply means having a low-potential terminal and a high-potential terminal, a capacitor for coupling said low-potential terminal to said chassis, an undesired leakage capacitor coupling said high-potential terminal to said chassis, a coupling choke connected to said current supply means in energy-transfer relation with the deflection means of the picture tube, said choke being adapted to utilize energy periodically released from the magnetic field of the deflection means for developing a high voltage to operate the picture tube, and a conductor having a loop portion disposed on said choke and inductively coupled thereto, said conductor being electrically connected in series with said first-mentioned capacitor between the chassis and said low-potential terminal for neutralizing the effect of said leakage capacitor, whereby said chassis is maintained at substantially the same potential as that of said low-potential terminal insofar as said current supply means is concerned.

8. In an electronic apparatus having a direct-current power supply with negative and positive terminals thereof, and which also includes a source of high voltage pulses connected on a low-potential side thereof to said negative power supply terminal and being coupled on the high-potential side thereof through an unwanted leakage capacitance to the chassis of the receiver, with said chassis being coupled through a small capacitor to said negative power supply terminal, the method of neutralizing unwanted voltage pulses developed by said high voltage pulse source between said chassis and said negative terminal through the medium of said leakage capacitance and said small capacitor, such method comprising the steps of deriving from said high voltage pulse source neutralizing voltage pulses substantially equal in magnitude to said unwanted voltage pulses, and applying said neutralizing voltage pulses through said small capacitor between said chassis and said negative terminal in opposition to said unwanted voltage pulses.

ROBERT M. CROOKER.

REFERENCES CITED

The following references are of record in the file of this patent:

UNITED STATES PATENTS

| Number | Name | Date |
|---|---|---|
| 2,275,028 | Chittick et al. | Mar. 3, 1942 |
| 2,346,499 | McCollum | Apr. 11, 1944 |
| 2,406,974 | Vance | Sept. 3, 1946 |
| 2,441,804 | Farry | May 18, 1948 |
| 2,444,902 | Torsch | July 6, 1948 |
| 2,466,712 | Kenyon | Apr. 12, 1949 |
| 2,500,766 | Obert et al. | Mar. 14, 1950 |